United States Patent [19]

Khlopkov et al.

[11] 4,246,012
[45] Jan. 20, 1981

[54] APPARATUS FOR ISOLATING TITANIUM TETRACHLORIDE

[76] Inventors: Leonid P. Khlopkov, ulitsa let Sovetskoi Ukrainy, 24, kv. 11; Stanislav I. Gashenko, ulitsa Gorkogo, 159, kv. 76; Alexandr A. Rogatkin, ulitsa 40 let Sovetskoi Ukrainy, 76, kv. 3, all of Zaporozhie; Dmitry V. Drobot, ulitsa Krasnoarmeiskaya, 27, kv. 13, Moscow; Grigory I. Silakov, ulitsa Yatsenko, 4a, kv. 59, Zaporozhie; Anatoly P. Danilevsky, ulitsa 40 let Sovetskoi Ukrainy, 78, kv. 38, Zaporozhie; Nikolai V. Galitsky, prospekt Mayakovskogo, 3a, kv. 13, Zaporozhie; Vladimir N. Kalmykov, ulitsa Lermontova, 2, kv. 19, Zaporozhie; Vitaly A. Musiiko, ulitsa Lermontova, 19, kv. 55, Zaporozhie; Vladimir I. Garmash, ulitsa Juzhno-Ukrainskaya, 19, kv. 50, Zaporozhie; Vladimir A. Tkalenko, ulitsa Yatsenko, 10, kv. 15, Zaporozhie, all of U.S.S.R.; Viktor F. Shipilov, deceased, late of Zaporozhie, U.S.S.R.; Elena S. Skibina, administrator, prospekt Lenina, 200, kv. 7, Zaporozhie, U.S.S.R.; Grennady V. Shipilov, administrator by, prospekt Lenina, 200, kv. 7, Zaporozhie, U.S.S.R.; Fedor D. Shipilov, administrator by, prospekt Lenina, 200, kv. 7, Zaporozhie, U.S.S.R.

[21] Appl. No.: 76,922

[22] Filed: Sep. 19, 1979

[51] Int. Cl.³ .............................. B01D 50/00
[52] U.S. Cl. .................................. 55/315; 55/269; 55/479; 55/71
[58] Field of Search .................. 55/71, 72, 79, 98, 99, 55/315, 342, 350, 474, 479, 429, 269; 423/492; 422/169, 177

[56] References Cited

U.S. PATENT DOCUMENTS

| 2,897,918 | 8/1959 | Schlotthauer et al. | 55/71 |
| 4,035,170 | 7/1977 | Lear, Jr. et al. | 55/474 |

FOREIGN PATENT DOCUMENTS

| 569459 | 1/1959 | Canada | 55/479 |

OTHER PUBLICATIONS

Sergeev & Galitsky–Titanium Metallurgy, p. 122, Metallurgy Publishers, 1971, (Moscow).

*Primary Examiner*—Bernard Nozick

[57] ABSTRACT

The apparatus according to the invention comprises a casing. The casing consists of two chambers: an inlet chamber and a filtering chamber each having a conical receptacle for collecting solid chlorides. The inlet chamber and the filtering chamber are provided each with guide webs and are separated from each other by a partition wall comprising a gas duct. The gas duct establishes a communication between the lower portions of the chambers in such a manner that the inlet end of the gas duct is arranged under the guide webs of the inlet chamber and the outlet end is arranged under the guide webs of the filtering chamber. The filtering chamber has inlet pipes for admission of pulp. A pipe for admission of a chloride pulp is arranged above the guide webs at a distance of from one to two times the diameter of the filtering chamber. The pipes for an oxychloride pulp is arranged below the guide webs which are permanently covered with a filtering material.

4 Claims, 1 Drawing Figure

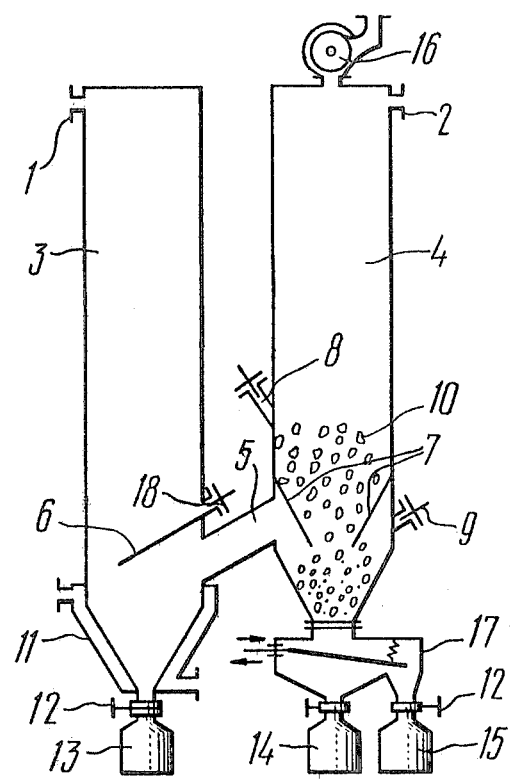

APPARATUS FOR ISOLATING TITANIUM TETRACHLORIDE

FIELD OF THE INVENTION

The invention relates to the field of cleaning industrial gases in the production of titanium, and more specifically it deals with methods for isolating titanium tetrachloride from a vapour and gas mixture.

BACKGROUND OF THE INVENTION

Known in the art is an apparatus for isolating titanium tetachloride from a vapour and gas mixture (cf. V.V. Sergeev, N.V. Galitsky et al. Titanium Metallurgy. Metallurg Publishers, 1971, p. 122 (in Russian)) which comprises a casing consisting of two chambers: an inlet chamber and a filtering chamber which are separated by a partition wall and provided with conical receptacles for collecting solid chlorides having chain mechanisms for chloride removal.

The prior art apparatus functions in the following manner.

A vapour and gas mixture containing $TiCl_4$, $SiCl_4$, $VOCl_3$, $CaCl_2$, $MgCl_2$, $MnCl_2$, $FeCl_3$, $AlCl_3$, $CrCl_4$, $CrCl_3$, $CO$, $CO_2$, $N_2$, $COCl_2$ and other vapour and gaseous chlorides is admitted at 600°–950° C. through a pipe to the inlet chamber where chlorides of Ca, Mn, Mg, Fe and other compounds, as well as fine particles of titanium slag are cooled, the inlet chamber and the conical receptacle being covered with a layer of chlorides and dust, the mixture flows into the filtering chamber upon an abrupt change of direction, where further cooling and precipitation of individual chlorides take place. Due to the fact that heat conductance of the deposited chlorides is poor, the throughput capacity of the apparatus decreases in time thus materially impairing quality of isolation of $TiCl_4$ from the vapour and gas mixture.

The disadvantage of the prior art apparatus resides in the fact that it operates on the intermitten basis since the deposited chlorides in the conical receptacle would clogg the partition wall and the operation is interrupted as the chlorides cannot be not permanently removed from both chambers and out of the apparatus without suspending its operation. Mechanisms normally used for removing chlorides from both chambers and conical receptacles are generally inoperable since the aggressive chloride medium causes their rapid damage.

It is an object of the invention to provide an apparatus which eliminates heavy labour required for cleaning the conical receptacles to remove the deposited chlorides.

Another object of the invention is to provide an apparatus operating on the continuous basis.

Still another object of the invention is to provide an apparatus ensuring high-grade purification of $TiCl_4$ from other chlorides.

The invention consists in that in an apparatus for isolating titanium tetrachloride from a vapour and gas mixture, comprising a casing which is divided by a partition wall into two chambers; an inlet chamber and a filtering chamber for admission of a vapour and gas mixture thereto, and a conical receptacle for collecting solid chlorides arranged under each of the chambers, according to the invention, the inlet chamber and a filtering chamber are provided each with guide webs and separated by a partition wall comprising a gas duct establishing a communication between the lower portions of both chambers in such a manner that the inlet end of the gas duct is arranged under the guide webs of the inlet chamber and the outlet end is arranged under the guide webs of the filtering chamber which has inlet pipes for admission of pulps, one pipe for chloride pulp being arranged above the guide webs at a distance from one to two times the diameter of the filtering chamber and the other pipe for oxychloride pulp being arranged below the guide webs which are permanently covered by a filtering material.

This construction of the apparatus enables a continuous removal of the deposited chloride layer and its feeding out of the apparatus without employing heavy labour under high gas concentration, while ensuring high grade of purification of titanium tetrachloride from other chlorides.

The guide webs of the inlet chamber are preferably inclined in the direction of flow of a vapour and gas mixture, and the guide webs of the filtering chamber are inclined in the direction of flow of the filtering material.

This construction enables a better removal of chlorides from the guide webs.

The gas duct establishing a communication between the inlet and filtering chambers is preferably arranged in an inclined position.

This facility ensures a continuous flow of the deposited chlorides in a direction towards the conical receptacles.

The filtering material preferably comprises a carbonaceous lump sorbent, such as pitch coke.

This enables a better re-use of the filtering material.

BRIEF DESCRIPTION OF THE DRAWINGS

The invention will now be described with reference to specific embodiments illustrated in the accompanying drawing, in which:

FIG. 1 shows a longitudinal section of the apparatus for isolating titanium tetrachloride from a vapour and gas mixture, according to the invention.

DETAILED DESCRIPTION OF THE INVENTION

The apparatus for purification of titanium tetrachloride gases comprises a casing having an inlet pipe 1 (FIG. 1) and an outlet pipe 2 for admission and delivery of a vapour and gas mixture, respectively, the casing consisting of two chambers: an inlet chamber 3 and a filtering chamber 4 which are separated by a partition wall comprising a gas duct 5. The inlet chamber 3 has guide webs 6. The filtering chamber 4 has guide webs 7. The gas duct 5 establishes a communication between the lower portions of both chambers 3, 4 in such a manner that the inlet end of the gas duct 5 is arranged under the guide webs 6 of the inlet chamber 3 and the outlet end is arranged under the guide webs 7 of the filtering chamber 4 which has inlet pipes 8 and 9 for admission of chloride pulp and oxychloride pulp, respectively. The chloride pulp pipe 8 is arranged above the guide webs 7 and the oxychloride pipe 9 is arranged below the guide webs 7. The guide webs 7 are permenently covered by a filtering material 10. The lower portion of the inlet chamber 3 is provided with a thermal jacket 11 which is used to maintain the temperature ensuring the discharge of solid chlorides under gravity.

The apparatus has airtight locks 12 and a collector 13 for high-boiling chlorides, as well as collectors 14 and 15 for collecting solid chlorides and wastes. The apparatus is provided with a loading mechanism 16 for the filtering material 10 and an airtight vibrating screen 17. A pipe 18 for removal of concentrated high-temperature chlorides is arranged over the guide webs 6 of the inlet chamber 3.

The apparatus functions in the following manner. A vapour and gas mixture containing $TiCl_4$, $SiCl_4$, $VOCl_3$, $CaCl_2$, $MgCl_2$, $MnCl_2$, $FeCl_3$, $FeCl_2$, $AlCl_3$, $Z_2Cl_4$, $CrCl_3$, $CO$, $CO_2$, $N_2$, $COCl_2$ and other chlorides formed during chlorination is admitted through the inlet pipe 1 to the inlet chamber 3 at 600°-950° C. The inlet chamber 3 having an enlarged working volume takes off heat of the vapour and gas mixture, and particularly of the chlorides of Ca, Mn, Mg, Fe and fine particles of titanium slag and reducing coke.

These materials are partially deposited to the walls of the inlet chamber and guide webs 6 to form aggregates of a size several times as great as that of particles of low-temperature chlorides $AlCl_3$, $FeCl_3$. The remaining part of high-temperature chlorides $CaCl_2$, $MgCl_2$, $MnCl_2$, $FeCl_2$ and solid particles of slag and coke, together with aggregates are precipitated in the lower portion of the inlet chamber 3 behind the guide webs 6, and the low-temperature chlorides and gases $TiCl_3$, $VOCl_3$, $COCl_2$, $CO$, $CO_2$, $N_2$, $FeCl_3$ and others are entrained under the guide webs 6 into the gas duct 5 and further to the filtering chamber 4. The filtering chamber 4 is filled with the dry filtering material 10 (adsorbent), such as pitch coke or titanium-containing briquetts to a level/above the inlet pipe 8. The guide webs 7 are arranged between the pipes 8 and 9 in an inclined position at an angle ensuring the flow of the filtering material 10 under gravity.

Low-temperature chlorides and gases $CO$, $CO_2$, $COCl_2$, $N_2$ and others are fed to the interlump space of the adsorbent flowing in counter-current with the filtering material to give up their heat to the adsorbent with simultaneous catching of chlorides of Fe, Al and other metals.

For a more complete cooling of the vapour and gas mixture, pulps are fed to the interlump space of the adsorbent through the inlet pipes 8 and 9, namely, a mixture of titanium tetrachloride and solid chlorides. A pulp with elevated content of solid residue, that is above 50 g/l is fed to the pipe 8, and a pulp containing less than 50 g/l of solids is fed to the pipe 9. Wetted sorbent in the upper zone of the filtering chamber 4 catches solid particles to transport them to the lower, hotter zone where titanium tetrachloride and HCl, $VOCl_3$ are evaporated to flow upwards, and solid chlorides of Fe, Al and other metals are continuously separated on a vibrating screen 17. Hot adsorbent is fed for chlorination or for a re-filtering by means of the collector 15, and solid chlorides and the chlorides from the inlet chamber 3 and filtering chamber 4 are discharged through the airtight lock 12 into receptacles 13 and 14 in which they are transported to a user, e.g. to be used in the production of building materials.

For inspection and cleaning from solid chlorides, there is provided a pipe 18 arranged in the inlet chamber 3 at the level of the guide webs 6 to eliminate condensation of vapours of $TiCl_4$, $VOCl_3$.

Sorbent is loaded by batches by means of a loading mechanism 16 depending on a pre-set sorbent level which is determined by the throughput capacity of a chlorination apparatus. Purified titanium tetrachloride and gases $CO$, $CO_2$, $COCl_2$, $N_2$ are fed for wet condensation through the gas duct 2.

What is claimed is:

1. An apparatus for isolating titanium tetrachloride from a vapour and gas mixture, comprising:
   a casing having two chambers;
   a first, inlet chamber designed for taking heat off the vapour and gas mixture, and separating fine solid particles of titanium slag and reducing coke;
   a second, filtering chamber designed for subsequent cleaning of titanium tetrachloride from solid chlorides;
   a conical receptacle for collecting said solid chlorides arranged under each chamber;
   guide webs arranged in each chamber and designed for settling solid chlorides in the inlet chamber and for accommodation of a filtering material in the filtering chamber, respectively;
   a partition wall comprising a gas duct establishing a communication between the lower portions of both chambers in such a manner that the inlet end of said gas duct is arranged under said guide webs of the inlet chamber and the outlet end is arranged under said guide webs of the filtering chamber;
   inlet pipes of the filtering chamber for admission of pulps;
   one of said pipes being designed for admission of chloride pulp and arranged above said guide webs at a distance of from one to two times the diameter of the filtering chamber, and the other pipe being designed for admission of oxychloride pulp and arranged below said guide webs which are premanently covered with a filtering material.

2. An apparatus according to claim 1, wherein said guide webs of said inlet chamber are inclined in the direction of flow of said vapour and gas mixture and said guide webs of said filtering chamber are inclined in the direction of flow of said filtering material.

3. An apparatus according to claim 1, wherein said gas duct establishing a communication between said inlet chamber and said filtering chamber is arranged in an inclined position.

4. An apparatus according to claim 1, wherein said filtering material comprises a carbonaceous lump sorbent, such as pitch coke.

* * * * *